US011217960B1

(12) United States Patent
Richardson et al.

(10) Patent No.: US 11,217,960 B1
(45) Date of Patent: Jan. 4, 2022

(54) MULTI-STAGE RAMAN AMPLIFIER

(71) Applicant: University of Central Florida Research Foundation, Inc., Orlando, FL (US)

(72) Inventors: Martin Richardson, Orlando, FL (US); Soumya Sarang, Orlando, FL (US); Patrick Roumayah, Orlando, FL (US); Nathan Bodnar, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 17/337,207

(22) Filed: Jun. 2, 2021

Related U.S. Application Data

(60) Provisional application No. 63/033,604, filed on Jun. 2, 2020.

(51) Int. Cl.
*H01S 3/30* (2006.01)
*H01S 3/10* (2006.01)
*H01S 3/16* (2006.01)
*H01S 3/102* (2006.01)
*H01S 3/23* (2006.01)

(52) U.S. Cl.
CPC ........ *H01S 3/10023* (2013.01); *H01S 3/1024* (2013.01); *H01S 3/10084* (2013.01); *H01S 3/1643* (2013.01); *H01S 3/2308* (2013.01); *H01S 3/2316* (2013.01); *H01S 3/30* (2013.01)

(58) Field of Classification Search
CPC ............. H01S 3/10023; H01S 3/10084; H01S 3/1024; H01S 3/30; H01S 3/1643; H01S 3/2308; H01S 3/2316
See application file for complete search history.

(56) References Cited

U.S. PATENT DOCUMENTS

| 9,017,633 | B2 | 4/2015 | Friel et al. |
| 9,172,208 | B1 * | 10/2015 | Dawson ................. H01S 3/302 |
| 9,882,344 | B2 | 1/2018 | Mildren |
| 10,095,084 | B2 | 10/2018 | Kobayashi et al. |

(Continued)

OTHER PUBLICATIONS

A. A. Kaminskii, et al., "High-order stimulated Raman scattering in CVD single crystal diamond", Laser Phys. Lett. 4(5), 350 (2007).

(Continued)

*Primary Examiner* — Michael Carter
(74) *Attorney, Agent, or Firm* — Suiter Swantz pc llo

(57) ABSTRACT

A diamond Raman laser may include a diamond Raman oscillator (DRO) with a first diamond gain medium, a seed laser providing a seed beam at a seed wavelength, and a cavity configured to resonate at a first-Stokes wavelength, the first-Stokes wavelength corresponding to first-Stokes emission in diamond when pumped with the seed wavelength, and where the DRO outputs a first-Stokes beam at the first-Stokes wavelength. The diamond Raman laser may further include a diamond Raman amplifier (DRA) to amplify the first-Stokes beam and generate an amplified first-Stokes beam, where the DRA includes two or more diamond Raman amplification stages, each including one or more second diamond gain media, and one or more optical filters to filter light with a second-Stokes wavelength generated in at least one of the one or more second gain media.

20 Claims, 4 Drawing Sheets

(56) References Cited

U.S. PATENT DOCUMENTS

2005/0163169 A1     7/2005   Lawandy et al.
2018/0323572 A1*   11/2018   Mildren .................. H01S 3/163

OTHER PUBLICATIONS

A. Sabella et al., "1240 nm diamond Raman laser operating near the quantum limit", Opt. Lett. 35(23), 3874—3876 (2010).

A. Sabella et al., "Diamond Raman laser with continuously tunable output from 3.38 to 3.8 pm", Opt. Lett. 39(13), 4037-4040 (2014).

D. J. Spence, "Spatial and Spectral Effects in Continuous-Wave Intracavity Raman Lasers", IEEE Jnl Selected Topics in Quant. Electronics 21(1), 1-8 (2015).

Demetriou, G., et al., "100 kW peak power external cavity diamond Raman laser at 2.52 pm", Optics express, 2019. 27 (7): p. 10296-10303.

E. Granados et al., "Deep ultraviolet diamond Raman laser", Optics Expr. 19(11), 10857-10863 (2011).

I. Friel, et al., "Control of surface and bulk crystalline quality in single crystal diamond grown by chemical vapour deposition". Diamond Relat. Mater. 18(58), 808-815 (2009).

Mckay, A., et al., "Diamond-based concept for combining beams at very high average powers", Laser & Photonics Reviews, 2017. 11(3).

Pashinin, V., et al., "External-cavity diamond Raman laser performance at 1240 nm and 1485 nm wavelengths with high pulse energy", Laser Physics Letters, 2016.13(6).

R.P. Mildren et al., (2013). Diamond Raman Laser Design and Performance. In Optical engineering of diamond, Wiley (pp. 239-276), Germany, Wiley-VCH Verlag GmbH & Co. KGaA.

W. Lubeigt, et al., Continuous-wave diamond Raman laser, Optics letters 35(17), 2994-2996 (2010).

\* cited by examiner

MULTI-STAGE RAMAN AMPLIFIER

CROSS-REFERENCE TO RELATED APPLICATION

The present application claims the benefit under 35 U.S.C. § 119(e) of U.S. Provisional Application Ser. No. 63/033,604, filed Jun. 2, 2020, entitled MULTI-STAGE RAMAN AMPLIFIER, naming Martin Richardson, Soumya Sarang, Patrick Roumayah, and Nathan Bodnar as inventors, which is incorporated herein by reference in the entirety.

GOVERNMENT LICENSE RIGHTS

This invention was made with Government support under contract FA9550-15-1-0041 awarded by the US Air Force Office of Scientific Research (AFOSR). The government has certain rights in the invention.

TECHNICAL FIELD

The present disclosure relates generally to amplified laser systems and, more particularly, to amplified Raman laser systems with diamond gain media.

BACKGROUND

While almost all high brightness laser development for the last few decades has been around 1 µm, many civil and defense applications such as material processing, atmospheric measurements, laser radar, laser rangefinders, and free-space optical communications are more suited to longer wavelengths. Lasers above 1.4 µm specifically benefit from high transmission in atmosphere and low eye-exposure risks, making them critical for any remote applications where bystanders may be involved. Erbium and direct diode lasers access these wavelengths, but have not achieved sufficiently high power for most of the aforementioned applications. Optical Parametric Oscillators (OPOs) have been shown to access these wavelengths with greater brightness and energy, however, they are impractically complex and costly for most commercial applications. There is therefore a need to develop systems and methods to cure the above deficiencies.

SUMMARY

A diamond Raman laser is disclosed in accordance with one or more illustrative embodiments of the present disclosure. In one illustrative embodiment, the diamond Raman laser includes a diamond Raman oscillator (DRO). In another illustrative embodiment, the DRO includes a first diamond gain medium. In another illustrative embodiment, the DRO includes a seed laser providing a seed beam at a seed wavelength. In another illustrative embodiment, the DRO includes a cavity that resonates at a first-Stokes wavelength, where the first-Stokes wavelength corresponds to first-Stokes emission in diamond when pumped with the seed wavelength, and where the diamond Raman oscillator outputs a first-Stokes beam at the first-Stokes wavelength. In another illustrative embodiment, the diamond Raman laser includes a diamond Raman amplifier (DRA) to amplify the first-Stokes beam and generate an amplified first-Stokes beam through stimulated Raman scattering. In another illustrative embodiment, the DRA includes one or more pump lasers to generate pump light at the seed wavelength. In another illustrative embodiment, the DRA includes two or more diamond Raman amplification stages, each including one or more second diamond gain media, where the first-Stokes beam and at least a portion of the pump light propagates colinearly through the two or more diamond Raman amplification stages. In another illustrative embodiment, the DRA includes one or more optical filters to filter light with a second-Stokes wavelength generated in at least one of the one or more second gain media, where the second-Stokes wavelength corresponds to second-Stokes emission in diamond when pumped with the first-Stokes wavelength.

A diamond Raman amplifier (DRA) is disclosed in accordance with one or more illustrative embodiments of the present disclosure. In one illustrative embodiment, the DRA includes one or more pump lasers to generate pump light at the seed wavelength. In another illustrative embodiment, the DRA includes two or more diamond Raman amplification stages to receive an input beam with an input wavelength and generate an amplified beam through stimulated Raman scattering, where each of the two or more diamond Raman amplification stages include one or more diamond gain media, and where the input beam and at least a portion of the pump light propagates colinearly through the two or more diamond Raman amplification stages. In another illustrative embodiment, the DRA includes one or more optical filters to filter light with a second-Stokes wavelength generated in at least one of the one or more diamond gain media, where the second-Stokes wavelength corresponds to Stokes emission in diamond when pumped with the first-Stokes wavelength.

A method is disclosed in accordance with one or more illustrative embodiments of the present disclosure. In one illustrative embodiment, the method includes generating a seed beam at a seed wavelength. In another illustrative embodiment, the method includes pumping a diamond Raman oscillator including a first diamond gain medium with the seed laser to generate a first-Stokes beam with a first-Stokes wavelength, where the first-Stokes wavelength corresponds to first-Stokes emission in diamond when pumped with the seed wavelength. In another illustrative embodiment, the method includes amplifying the first-Stokes beam with a diamond Raman amplifier (DRA). In another illustrative embodiment, the DRA includes one or more pump lasers to generate pump light at the seed wavelength. In another illustrative embodiment, the DRA includes two or more diamond Raman amplification stages, each including one or more second diamond gain media, where the first-Stokes beam and at least a portion of the pump light propagates colinearly through the two or more diamond Raman amplification stages. In another illustrative embodiment, the method includes filtering light with a second-Stokes wavelength generated in at least one of the one or more second gain media with one or more optical filters located in the DRA, where the second-Stokes wavelength corresponds to second-Stokes emission in diamond when pumped with the first-Stokes wavelength.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1:
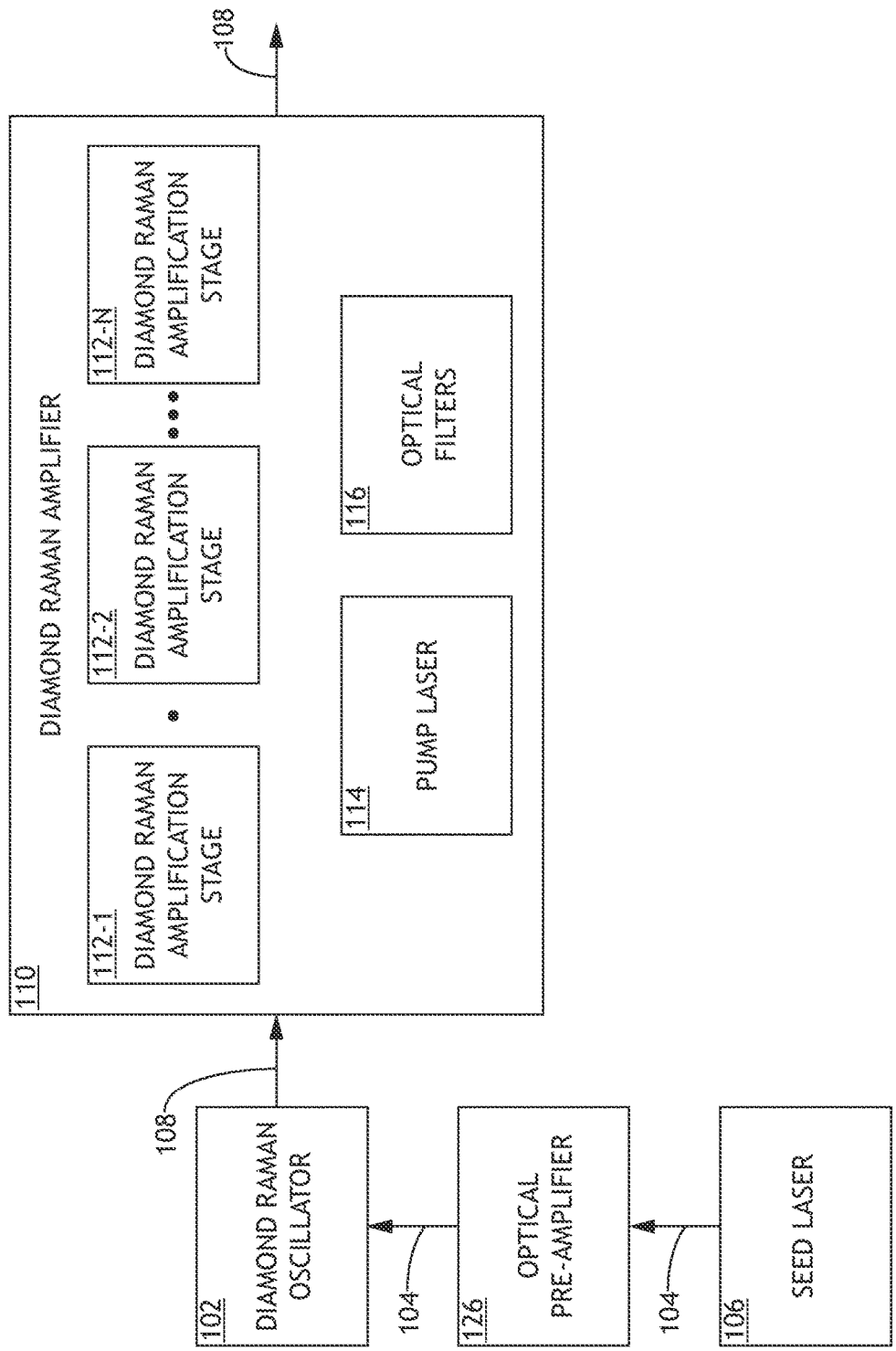
FIG. 1 is a conceptual view of a diamond Raman master-oscillator-power-amplifier (DR-MOPA), in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for generating amplified laser light using a diamond Raman master oscillator power amplifier (e.g., a DR-MOPA) architecture. In some embodiments, a DR-MOPA includes a diamond Raman oscillator (DRO) pumped at a seed wavelength to generate a first-Stokes beam at a first-Stokes wavelength corresponding to first-Stokes emission in diamond in response to the seed wavelength, a diamond Raman amplifier (DRA), two or more diamond Raman amplification stages (DRA stages) to amplify the first-Stokes beam, and one or more optical filters (e.g., between the two or more DRA stages) to suppress a second-Stokes wavelength (e.g., corresponding to second-Stokes emission in diamond in response to the seed wavelength) during the amplification of the first-Stokes beam. In this way, pump suppression by second-Stokes emission may be mitigated to enable high-power amplification of the first-Stokes beam. Some embodiments further include a diamond Raman converter (DRC) to convert the amplified first-Stokes beam to a second-Stokes beam at the second-Stokes wavelength. In this way, the high-power laser light at the second-Stokes wavelength may be efficiently generated.

Diamond Raman lasers (DRLs) provide an efficient and feasible alternative to OPOs to achieve wavelengths above 1.4 μm owing to simple laser designs, automatic phase-matching conditions, and diamond's exceptional optical and thermal properties. Also, as the thermal conductivity of diamond is the highest of any bulk material, such lasers are very resistant to thermal lensing.

DRLs in general do not require rare-earth doping. Rather, DRLs function by Raman-shifting a pump signal (such as, but not limited to, a high energy Nd:YAG laser) to longer wavelengths in a diamond medium. In this way, the emission is based on a non-linear effect in which pump light excites vibrational modes of the atomic structure or crystal lattice, where the wavelength of the output light is related to a difference between the wavelength of the pump light and that of the vibrational modes and gain is proportional to the intensity of the first-Stokes signal and the pump. The output wavelength is known as a first-Stokes wavelength. Further, this effect may be cascaded to achieve second-Stokes wavelengths and beyond.

It is contemplated herein that the generation of second-Stokes wavelengths (or higher order Stokes wavelengths) provides substantial flexibility for the generation of long wavelengths with DRLs, but also limits the achievable output power. In particular, such wavelengths saturate pump depletion. DRL designs have thus been limited to a relatively narrow range of input intensities and have had low potential for scalability.

It is further contemplated herein that high-power amplification of first-Stokes wavelengths may be achieved using multiple amplification stages with optical filters for second-Stokes suppression. Accordingly, embodiments of the present disclosure are directed to a DR-MOPA providing amplification of a first-Stokes beam at a first-Stokes wavelength (e.g., generated with a DRO) with two or more DRAs with optical filters in or between the DRAs providing filtering of second-Stokes light. In this configuration, the relative powers (or energy densities) of the first-Stokes beam during amplification and any generated second-Stokes beams (or higher-order Stokes beams) may be controlled to provide efficient amplification of the first-Stokes beam. For example, the amplification in any particular DRA may be managed to limit undesirable effects of second-Stokes emission in that DRA and the optical filters may then remove (or at least substantially filter) the second-Stokes wavelengths prior to a successive DRA.

Additionally, the multi-stage amplifier configuration disclosed herein facilitates efficient management of thermal effects in the DRAs. Although Raman beam cleanup effects in Raman crystals may efficiently transfer energy from highly divergent (high $M^2$) pump beams into diffraction-limited Raman beams, the thermal effects in the material can nonetheless pose a challenge in achieving high output beam-quality. However, the multi-stage amplifier configuration disclosed herein may distribute the thermal load across multiple DRAs such that thermal management requirements on any particular DRA may be reduced (e.g., relative to a single-stage configuration) and further retain good output beam quality. As a result, this multi-stage amplifier configuration may provide a linearly scalable approach for the generation of a high-power first-Stokes beam, which is limited only by damage thresholds of associated optical elements.

In some embodiments, a DR-MOPA further includes one or more DRCs to convert the first-Stokes beam into a second-Stokes beam. For example, a DRC may transfer energy in a first-Stokes beam at a first-Stokes wavelength to a second-Stokes beam at a second-Stokes wavelength. Additional diamond Raman converters may also be utilized to provide energy at higher-order Stokes wavelengths. When combined with multi-stage amplification of a first-Stokes beam with optical filters for suppression of second-Stokes light (or higher-order Stokes light), a DR-MOPA as disclosed herein may generate high-energy beams at any desired Stokes wavelength.

Further, since Stokes wavelengths (e.g., first-Stokes wavelengths, second-Stokes wavelengths, third Stokes wavelengths, or the like) are associated with Raman shifts of an incident seed beam, the output of a DR-MOPA may generally be tuned to a wide range of wavelengths by tuning or otherwise controlling the wavelength of the seed beam. As a non-limiting illustration, a DR-MOPA as disclosed herein may provide an amplified second-Stokes beam at 1485 nm using a seed wavelength of 1064 nm (e.g., generated by a Nd:YAG laser). In this configuration, the DRO may generate a first-Stokes beam at 1239 nm, which is amplified by two or more DRAs and then converted to a second-Stokes beam at 1485 nm using a DRC.

A DR-MOPA as disclosed herein may also be flexibly designed to provide output pulses at a range of pulse energies and repetition rates. For example, such a system may be capable of generating 10s-100s of mJ-level nanosecond laser pulses at the second-Stokes wavelength (e.g., 1485 nm) at kHz repetition rates using conventional commercial off-the-shelf (COTS) diode-pumped 1064 nm Nd:YAG solid-state lasers.

Referring now to FIGS. 1-4, systems and methods for generating amplified laser light are described in greater detail in accordance with one or more embodiments of the present disclosure.

FIG. 1 is a conceptual view of a DR-MOPA 100, in accordance with one or more embodiments of the present disclosure. In one embodiment, a DR-MOPA 100 includes a diamond Raman oscillator (DRO) 102 to receive a seed beam 104 at a seed wavelength from a seed laser 106 and generate a first-Stokes beam 108 at a first-Stokes wavelength in response to the seed beam 104.

The DRO 102 may have any oscillator design suitable for generating the first-Stokes beam 108 from the seed beam 104. For example, the DRO 102 may include a diamond gain medium and a laser cavity designed to resonate at the first-Stokes wavelength. In this configuration, the seed beam 104 may propagate through the diamond gain medium to generate light having the first-Stokes wavelength through Raman scattering which is recirculated through the diamond gain medium by cavity mirrors to build up energy within the laser cavity through stimulated Raman scattering. The first-Stokes beam 108 may then exit the DRO 102 through one of the cavity mirrors (e.g., operating as an output coupler).

The seed laser 106 may include any laser design suitable for generating a seed beam 104 suitable for inducing Raman scattering in the diamond gain medium of the DRO 102. For example, the seed wavelength of the seed laser 106 may include any wavelength transparent to diamond and may thus include wavelengths in the range of approximately 230 nm to 100 microns. Further, the first-Stokes wavelength of the first-Stokes beam 108 will be shifted from the seed wavelength by the Raman shift of diamond, which is approximately 40 THz based on the chemistry of diamond. As a result, the first-Stokes beam 108 may be tuned to any wavelength transparent to diamond by tuning or otherwise controlling the wavelength of the seed beam 104 (e.g., the seed wavelength).

The seed laser 106 may further operate with any temporal profile. In one embodiment, the seed laser 106 operates as a continuous-wave (CW) laser to generate a CW first-Stokes beam 108. In another embodiment, the seed laser 106 operates as a pulsed laser to generate a pulsed first-Stokes beam 108. For example, the first-Stokes beam 108 may generally include pulses on the order of femtosecond, picoseconds, nanosecond, or longer based on the properties of the seed laser 106 and the design of the DRO 102.

Additionally, the seed laser 106 and/or the DRO 102 may be implemented using any laser technology known in the art such as, but not limited to, solid-state or fiber laser technology.

As an illustrative example, the seed laser 106 may include a Nd:YAG laser operating at 1064 nm, which provides first-Stokes emission at 1239 nm, where the Nd:YAG pump lasers may be based on any laser technology such as, but not limited to, COTS diode-pumped technology. For instance, the seed laser may include a COTS narrow-bandwidth high rep-rate short pulse 10 ns Nd:YAG laser, a custom-built high repetition rate diode-pumped solid-state laser (DPSSL) system with a variable pulse duration (e.g., in the range of 1-40 ns), or any suitable system.

In some embodiments, a DR-MOPA 100 includes at least one multi-stage diamond Raman amplifier (DRA) 110 with two or more diamond Raman amplification stages (DRA stages) 112 to amplify the first-Stokes beam 108. For example, FIG. 1 illustrates a DRA 110 including DRA stages 112-1 through 112-N. The DRA 110 may further include one or more pump lasers 114 to pump the two or more DRA stages 112, where the one or more pump lasers 114 may provide pump light having the same wavelength as the seed laser 106 (e.g., the seed wavelength).

In one embodiment, a DRA stage 112 includes one or more diamond gain media pumped by one or more pump lasers 114 to amplify the first-Stokes beam 108 through stimulated Raman scattering. For example, the first-Stokes beam 108 from the DRO 102 may be aligned coaxially with pump light in the diamond to provide amplification through stimulated Raman scattering. The desired pulse characteristics for the pump lasers 114 may be determined by the characteristics of the DRO 102 to promote efficient amplification of the first-Stokes beam 108 from the DRO 102. However, it is contemplated herein that the beam quality of the pump lasers 114 does not need to be the same as, and may be significantly worse than, the beam quality of the first-Stokes beam 108 from the DRO 102. This is due to the Raman effect in the diamond crystal, where the energy from the pump lasers 114 may be channeled to the first-Stokes beam 108 through phonon interactions. As a result, a DRA 110 may be implemented with relatively lower-cost and/or compact pump lasers 114 while maintaining desired beam profile characteristics in the amplified first-Stokes beam 108.

A DRA stage 112 may have any suitable design suitable for amplifying the first-Stokes beam 108. Further, a DRA 110 may generally include any selected number of DRA stages 112 having the same or different designs. In this way, the gain characteristics of each DRA 110 may be tailored to provide highly-controlled gain, thermal management, beam profile characteristics of the amplified first-Stokes beam 108, and/or use of pump power from the pump lasers 114 through the entire DRA 110. For example, a particular DRA stage 112 may include a single diamond gain medium or multiple diamond gain media depending on the amount of gain desired for the particular stage. Further, any number of pump lasers 114 may be utilized to pump any number of DRA stages 112. For instance, a single pump laser 114 may pump one or more DRA stages 112. By way of another example, pump beams from two or more pump lasers 114 may be combined to pump one or more DRA stages 112. In this way, the first-Stokes beam 108 may be amplified to powers (or energy densities) well beyond the amplification provided by any given pump laser 114. By way of another example, any particular DRA stage 112 may provide single-pass or multi-pass operation.

It is contemplated herein that light with the first-Stokes wavelength generated in the DRO 102 or any of the DRA stages 112 may induce Raman scattering at a second-Stokes wavelength. Further, this process may generally cascade to provide higher-order Stokes wavelengths. For example, some of the power of the first-Stokes beam 108 may go into the formation of a second-Stokes beam, which may reduce the otherwise available power of the first-Stokes beam 108. This second-Stokes beam may then be amplified in a diamond gain medium through stimulated Raman scattering using additional energy from the first-Stokes beam 108 in much the same way that the first-Stokes beam 108 itself is amplified using energy from the pump lasers 114. As a result, the generation of light at second-Stokes wavelengths (or higher-order wavelengths) may limit or otherwise diminish the formation of a high-power first-Stokes beam 108.

In some embodiments, a DR-MOPA 100 includes one or more optical filters 116 in the DRA 110 to pass the first-Stokes wavelength and reject the second-Stokes wavelength and/or higher-order Stokes wavelengths. The optical filters 116 may generally be located at any suitable location within the DRA 110 such as, but not limited to, prior to, after, or within any of the DRA stages 112. In this way, the power, intensity, or energy density of light with the second-Stokes wavelength (or higher-order Stokes wavelengths) may be suppressed or otherwise limited within the DRA 110 to facilitate increased amplification of the first-Stokes beam 108. For example, various aspects of any particular DRA stage 112 such as, but not limited to, the gain, the length of a diamond gain medium, or a number of diamond gain media may be tailored to amplify the first-Stokes beam 108 while keeping the power in the second-Stokes wavelength at or below a selected threshold. Then, optical filters 116 may reject the second-Stokes wavelengths prior to a subsequent DRA stage 112. It is contemplated herein that such a multi-stage amplification approach with optical filters 116 may enable the formation of a first-Stokes beam 108 with a substantially higher power than possible using traditional techniques. In a general sense, any number of DRA stages 112 and optical filters 116 may be used to provide highly-controlled amplification to any desired power, intensity, or energy density. In some cases, the amount of amplification possible is limited only by material damage thresholds of constituent optics.

The optical filters 116 may include any type of filters known in the art such as, but not limited to, thin-film filters (e.g., dielectric filters) or metallic filters. Further, an optical filter 116 may pass first-Stokes wavelengths through transmission or reflection, and may reject second-Stokes wavelengths (or higher-order Stokes wavelengths) through any combination of transmission, reflection, or absorption.

Figure 2:
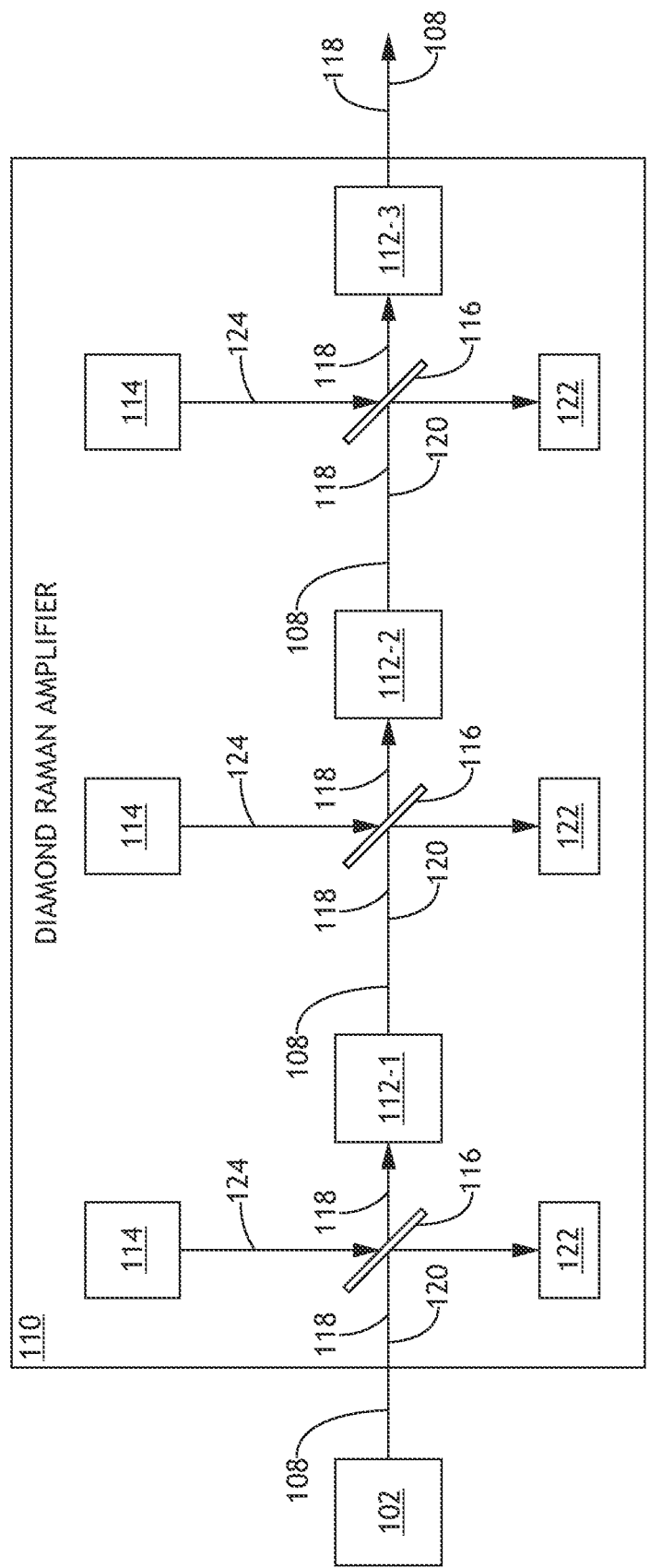
FIG. 2 is a schematic view of a DR-MOPA including optical filters operating as second-Stokes filters and pump coupling mirrors for diamond Raman amplifier stages, in accordance with one or more embodiments of the present disclosure.

FIG. 2 is a schematic view of a DR-MOPA 100 including optical filters 116 operating as second-Stokes filters and as pump coupling mirrors for DRA stages 112 (e.g., any of DRA stages 112-1,112-2,112-3), in accordance with one or more embodiments of the present disclosure. For example, the optical filters 116 may operate as wavelength multiplexers to combine the first-Stokes beam 108 with pump light from the pump lasers 114 and further to divert second-Stokes wavelengths from the optical path of the first-Stokes beam 108 prior to the DRA stages 112. As illustrated in FIG. 2, a first-Stokes beam 108 from the DRO 102 or any prior DRA stage 112 may include first-Stokes wavelengths 118 and second-Stokes wavelengths 120, and an optical filter 116 may pass the first-Stokes wavelengths 118 and reject the second-Stokes wavelengths 120. For instance, the DRA 110 may then include one or more beam blocks 122 or other elements to absorb or otherwise manage the rejected second-Stokes wavelengths 120. The optical filter 116 may further combine the passed first-Stokes wavelengths 118 with pump light 124 from a pump laser 114 for amplification of the first-Stokes wavelengths 118 by a DRA stage 112. However, it is to be understood that FIG. 2 and the associated description is provided solely for illustrative purposes and should not be interpreted as limiting. For example, the optical filters 116 may be provided as separate components and need not be combined on a common substrate with pump-coupling optics.

In some embodiments, a DR-MOPA 100 includes an optical pre-amplifier 126 to amplify the seed beam 104 to a desired level prior to entering the DRO 102. In this way, the gain requirements on the DRA 110 required to generate a first-Stokes beam 108 with a certain power may be reduced or otherwise controlled. The optical pre-amplifier 126 may include any type of optical pre-amplifier known in the art suitable for amplifying the seed beam 104 by a selected amount. For example, the optical pre-amplifier 126 may include, but is not limited to, a diode-pumped Yb-fiber pre-amplifier.

In some embodiments, a DR-MOPA 100 includes one or more Diamond Raman Converters (DRCs) 128 to convert the amplified first-Stokes beam 108 from the DRA 110 to a second-Stokes beam 130 at a second-Stokes wavelength or a higher-order Stokes wavelength.

Figure 3:
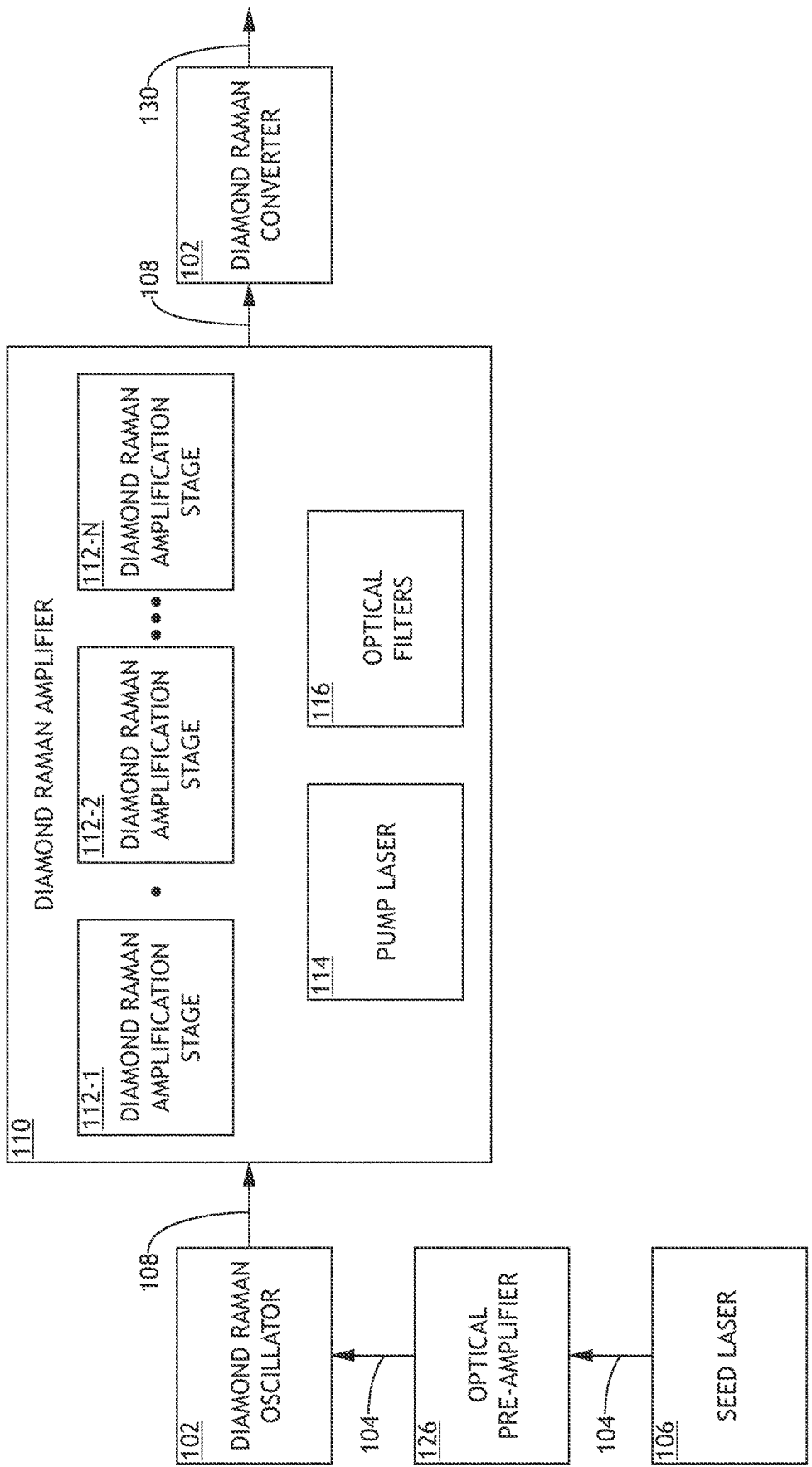
FIG. 3 is a schematic view of the DR-MOPA of FIG. 1 further including a diamond Raman converter, in accordance with one or more embodiments of the present disclosure.

FIG. 3 is a schematic view of the DR-MOPA 100 of FIG. 1 further including a DRC 128, in accordance with one or more embodiments of the present disclosure. For example, a DRC 128 may include one or more diamond gain media, where the amplified first-Stokes beam 108 from the DRA 110 is colinearly propagated with light at the second-Stokes wavelength through the diamond to induce a transfer of energy from the first-Stokes wavelength to the second-Stokes wavelength. In particular, the second-Stokes wavelength may be shifted from the first-Stokes wavelength by the Raman shift of diamond (e.g., 40 THz) in a manner similar to the generation of the first-Stokes wavelength from the seed wavelength.

The light at the second-Stokes wavelength may be provided as a separate beam (e.g., with a dedicated laser source) or may already be present in the amplified beam from the DRA 110. For example, in a configuration with a DRC 128, residual second-Stokes emission generated in a final DRA stage 112 may not be suppressed with optical filters 116 prior to entering the DRC 128 and may thus operate as a seed for stimulated Raman scattering at the second-Stokes wavelength in the DRC 128. By way of another example, residual pump light from a pump laser 114 (e.g., from a previous DRA stage 112 or other any other source) may be used to seed an additional DRO designed to resonate at the second-Stokes wavelength and generate a second-Stokes beam used to initiate or otherwise seed the conversion process in the DRC 128. By way of another example, residual second-Stokes emission deflected from the optical path of the first-Stokes beam 108 in the DRA 110 by the optical filters 116 may be combined and utilized as a seed for the DRC 128.

It is contemplated herein that a DRC 128 to generate a second-Stokes beam 130 based on an amplified first-Stokes beam 108 from a DRA 110 as disclosed herein may provide an additional pathway for the generation of high-power beams using Raman amplification processes. For example, although the wavelength of the first-Stokes beam 108 may generally be tuned by controlling the seed wavelength, it may be impractical or undesirable in some applications to provide a seed laser 106 and pump lasers 114 at a wavelength required to directly generate a first-Stokes beam 108 at a desired output wavelength.

As an illustration and continuing the non-example above, a second-Stokes beam 130 at a second-Stokes wavelength of 1485 nm may be generated using a seed laser 106 and pump lasers 114 with wavelengths at 1064 nm (e.g., using mature Nd:YAG technology) to provide a first-Stokes beam 108 with a wavelength of 1239 nm and a DRC 128 to generate the second-Stokes beam 130 at 1485 nm. In this way, the DR-MOPA 100 may be driven by cost-effective, compact, and robust Nd:YAG technology. It is to be understood, however, that these principles may be applied to provide a second-Stokes beam 130 at any desired wavelength using any selected seed wavelengths.

It is further contemplated herein that a DRC 128 may have any design suitable for generating a second-Stokes beam 130 from a first-Stokes beam 108. For example, the DRC 128 may include any number of conversion stages (e.g., pumped with additional light sources at the second-Stokes wavelength) and/or any number of diamond gain media in any stage.

Additionally, the DR-MOPA 100 may include any number of cascaded DRCs 128 to provide output at higher-order Stokes wavelengths. For example, the DR-MOPA 100 may include an additional DRC 128 to transfer energy from the second-Stokes beam 130 to a third Stokes beam having a third Stokes wavelength.

Figure 4:
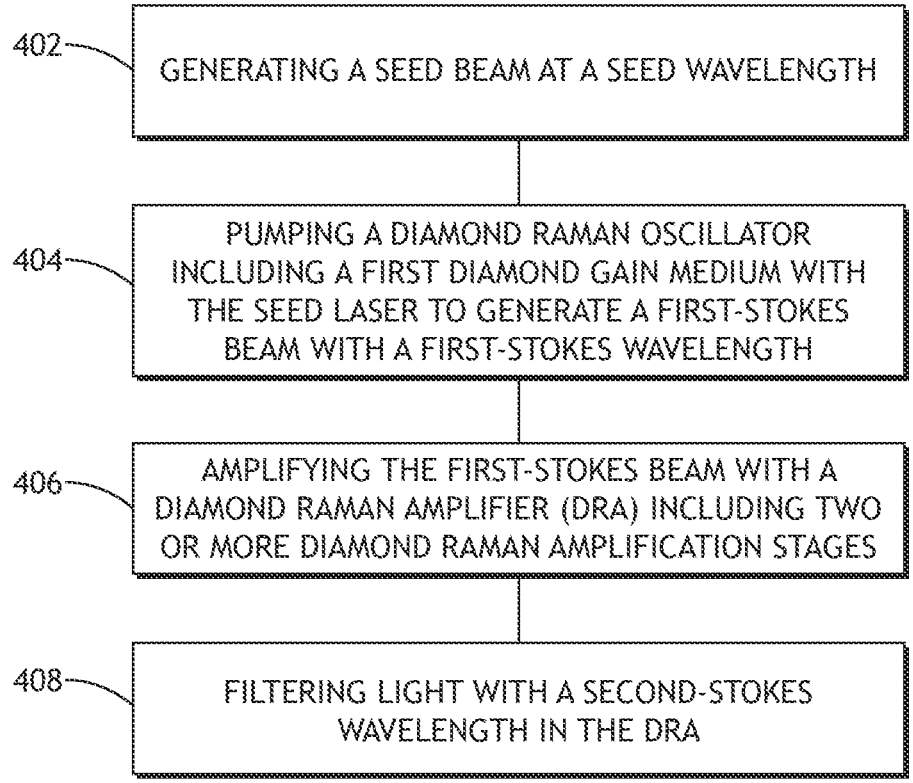
FIG. 4 is a flow diagram illustrating steps performed in a method amplifying laser light with Raman amplification, in accordance with one or more embodiments of the present disclosure.

FIG. 4 is a flow diagram illustrating steps performed in a method 400 amplifying laser light with Raman amplification, in accordance with one or more embodiments of the present disclosure. Applicant notes that the embodiments and enabling technologies described previously herein in the context of the DR-MOPA 100 should be interpreted to extend to the method 400. It is further noted, however, that the method 400 is not limited to the architecture of the DR-MOPA 100.

In one embodiment, the method 400 includes a step 402 of generating a seed beam at a seed wavelength. In another embodiment, the method 400 includes a step 404 of pumping a diamond Raman oscillator including a first diamond gain medium with the seed laser to generate a first-Stokes beam with a first-Stokes wavelength. For example, the first-Stokes wavelength may correspond to first-Stokes emission in diamond when pumped with the seed wavelength. In this way, the first-Stokes beam may have any wavelength suitable for inducing Raman scattering in diamond, which may generally include any wavelength in a transmission window of diamond. For example, the first-Stokes beam may have a wavelength in the range of 230 nm to 100 microns.

In another embodiment, the method 400 includes a step 406 of amplifying the first-Stokes beam with a diamond Raman amplifier (DRA) including two or more diamond Raman amplification stages. For example, the two or more diamond Raman amplification stages may be pumped using pump light at the seed wavelength and may amplify the first-Stokes beam through stimulated Raman scattering. Further, the two or more diamond Raman amplification stages may have any design suitable for amplifying the first-Stokes beam such as, but not limited to, single-pass or multi-pass designs.

In another embodiment, the method 400 includes a step 408 of filtering light with a second-Stokes wavelength in the DRA, where the second-Stokes wavelength may correspond to second-Stokes emission in diamond when pumped with the first-Stokes wavelength. For example, the step 408 may be implemented using optical filters in the DRA designed to filter light with the second-Stokes wavelength. In particular, the optical filters may suppress second-Stokes light generated in any of the two or more diamond Raman amplification stages, which may limit the achievable amplification in existing Raman laser systems. As a result, the first-Stokes light may undergo highly-controlled amplification to nearly arbitrary power levels limited by damage thresholds of constituent optics rather than second-Stokes emission (or higher-order Stokes emission).

In another embodiment, though not shown in FIG. 4, the method may include a step of converting at least a portion of the first-Stokes beam to a second-Stokes beam at a second-Stokes wavelength by propagating the first-Stokes beam co-linearly with light at the second-Stokes wavelength through a diamond Raman converter including one or more third diamond gain media. In this way, the high-energy first-Stokes beam may be further converted to even longer wavelengths through another stimulated Raman scattering.

Referring now generally to FIGS. 1-4, a DR-MOPA 100 as disclosed herein may provide multiple benefits over currently available technologies.

For example, a DR-MOPA 100 as disclosed herein may provide much more flexibility with respect to pulse energy than existing diamond Raman laser technologies. Currently available beam combination techniques in diamond Raman laser technology rely on parallel architectures. However, a central challenge for the conversion efficiency in this architecture is the generation of the parasitic higher order Stokes and anti-Stokes wavelengths. Additionally, the mitigation of the thermal effects owing to the thermal load may constrain the feasibility and scalability of such a design.

In contrast, a DR-MOPA 100 as disclosed herein may provide high total amplification of first-Stokes wavelengths without the effects of parasitic second-Stokes due to the combination of multi-stage amplification and controlled second-Stokes suppression. Further, a DR-MOPA 100 disclosed herein is linearly scalable through the addition of more DRA stages 112. In this way, the amplified first-Stokes beam 108 may be scaled until it reaches a damage threshold for incident optics.

By way of another example, a DR-MOPA 100 with a DRC 128 as disclosed herein may provide a simple and feasible architecture for achieving high powers at second-Stokes wavelengths or higher-order stokes wavelengths. For instance, amplifying the first-Stokes wavelengths while suppressing the second-Stokes wavelengths followed by converting the amplified first-Stokes wavelengths to second-Stokes wavelengths may provide higher output powers than achievable in alternative designs where both first and second-Stokes resonates in a common oscillator or amplifier. As a result, a DR-MOPA 100 as disclosed herein is expected to achieve over 200 times the next highest energy ever achieved in an existing diamond Raman laser system.

By way of another example, a DR-MOPA 100 as disclosed herein enables highly-controlled thermal management throughout the amplification process by distributing the load across many stages. In particular, the heat generated at each DRA stage 112 is based only on the quantum defect of the pump for that DRA stage 112, which drastically simplifies the cooling design. A DR-MOPA 100 as disclosed herein can also be made to be very compact since the pump and diamond only need be separated by enough space for the pump light to focus.

By way of another example, a DR-MOPA 100 as disclosed herein may be flexibly designed to operate in either a pulsed regime (e.g., with pulses on the order of femtoseconds, picosecond, nanoseconds, or longer), or a continuous-wave (CW) regime. As an illustration, although the single pass gain may be low in the CW regime, it may generally be difficult to design a high-power single-stage multi-pass diamond Raman laser owing to the unavailability of optical isolators to handle large optical feedback from the laser to the pump source. However, the systems and methods disclosed herein including multiple amplification stages with second-Stokes suppression may be designed to provide multi-pass operation for each DRA stage 112 (or at least some DRA stages 112) in a CW regime to increase the Raman gain without considering the optical feedback. Alternatively, the gain can be increased by using multiple diamond gain media in one or more DRA stages 112 as disclosed herein.

A DR-MOPA 100 as disclosed herein may further be utilized in a wide range of applications including, but not limited to, Lidar, infrared sensing, directed energy, range finding, target illumination, laser material processing, medical applications, generation of inaccessible wavelengths, generation of high energy pulses, or nonlinear beam combining.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A diamond Raman laser comprising:
   a diamond Raman oscillator comprising:
      a first diamond gain medium;
      a seed laser providing a seed beam at a seed wavelength; and
      a cavity configured to resonate at a first-Stokes wavelength, the first-Stokes wavelength corresponding to first-Stokes emission in diamond when pumped with the seed wavelength, wherein the diamond Raman oscillator outputs a first-Stokes beam at the first-Stokes wavelength; and
   a diamond Raman amplifier (DRA) to amplify the first-Stokes beam and generate an amplified first-Stokes beam through stimulated Raman scattering, the DRA comprising:
      one or more pump lasers to generate pump light at the seed wavelength;
      two or more diamond Raman amplification stages, each including one or more second diamond gain media, wherein the first-Stokes beam and at least a portion of the pump light propagates colinearly through the two or more diamond Raman amplification stages; and
      one or more optical filters to filter light with a second-Stokes wavelength generated in at least one of the one or more second gain media, the second-Stokes wavelength corresponding to second-Stokes emission in diamond when pumped with the first-Stokes wavelength.

2. The diamond Raman laser of claim 1, wherein at least one of the one or more optical filters is located between at least two of the two or more diamond Raman amplification stages.

3. The diamond Raman laser of claim 2, wherein at least one of the one or more optical filters is further configured to combine the first-Stokes beam and at least a portion of the pump light along a colinear path prior to at least one of the two or more diamond Raman amplification stages.

4. The diamond Raman laser of claim 1, wherein at least one of the one or more optical filters are located within at least one of the two or more diamond Raman amplification stages.

5. The diamond Raman laser of claim 1, further comprising:
   a diamond Raman converter to convert at least a portion of the amplified first-Stokes beam from the DRA to a second-Stokes beam with the second-Stokes wavelength, wherein the diamond Raman converter includes one or more third diamond gain media, wherein the amplified first-Stokes beam and the second-Stokes beam propagate colinearly through the one or more third diamond gain media.

6. The diamond Raman laser of claim 5, wherein the seed wavelength is 1064 nm, wherein the first-Stokes wavelength is 1239 nm, wherein the second-Stokes wavelength is 1485 nm.

7. The diamond Raman laser of claim 6, wherein at least one of the seed laser or the one or more pump lasers comprise:
   a Nd:YAG laser.

8. The diamond Raman laser of claim 1, wherein at least one of the two or more diamond Raman amplification stages comprises:
   a single-pass amplification stage.

9. The diamond Raman laser of claim 1, wherein the at least one of the two or more diamond Raman amplification stages comprises:
   a multi-pass amplification stage.

10. A diamond Raman amplifier comprising:
    one or more pump lasers to generate pump light at a seed wavelength;
    two or more diamond Raman amplification stages configured to receive an input beam with an input wavelength and generate an amplified first-Stokes beam through stimulated Raman scattering, wherein each of the two or more diamond Raman amplification stages include one or more diamond gain media, wherein the input beam and at least a portion of the pump light propagates colinearly through the two or more diamond Raman amplification stages; and
    one or more optical filters to filter light with a second-Stokes wavelength generated in at least one of the one or more diamond gain media, the second-Stokes wavelength corresponding to Stokes emission in diamond when pumped with the first-Stokes wavelength.

11. The diamond Raman amplifier of claim 10, wherein at least one of the one or more optical filters is located between at least two of the two or more diamond Raman amplification stages.

12. The diamond Raman amplifier of claim 10, wherein at least one of the one or more optical filters is further configured to combine the amplified first-Stokes beam and at least a portion of the pump light along a colinear path prior to at least one of the two or more diamond Raman amplification stages.

13. The diamond Raman amplifier of claim 10, wherein at least one of the one or more optical filters are located within at least one of the two or more diamond Raman amplification stages.

14. The diamond Raman amplifier of claim 10, further comprising:
a diamond Raman converter to convert at least a portion of the amplified first-Stokes beam from the DRA to a second-Stokes beam with the second-Stokes wavelength, wherein the diamond Raman converter includes one or more third diamond gain media, wherein the amplified first-Stokes beam and the second-Stokes beam propagate colinearly through the one or more third diamond gain media.

15. The diamond Raman amplifier of claim 10, wherein at least one of the two or more diamond Raman amplification stages comprises:
a single-pass amplification stage.

16. The diamond Raman amplifier of claim 10, wherein at least one of the two or more diamond Raman amplification stages comprises:
a multi-pass amplification stage.

17. The diamond Raman amplifier of claim 10, wherein filtering light with the second-Stokes wavelength generated in at least one of the one or more second diamond gain media with one or more optical filters located in the DRA comprises:
filtering light with a second-Stokes wavelength generated in at least one of the one or more second diamond gain media with one or more optical filters located between at least two of the two or more diamond Raman amplification stages.

18. The diamond Raman amplifier of claim 17, further comprising:
combining the first-Stokes beam and at least a portion of the pump light along a colinear path prior to at least one of the two or more diamond Raman amplification stages with at least one of the one or more optical filters.

19. A method comprising:
generating a seed beam at a seed wavelength;
pumping a diamond Raman oscillator including a first diamond gain medium with a seed laser to generate a first-Stokes beam with a first-Stokes wavelength, the first-Stokes wavelength corresponding to first-Stokes emission in diamond when pumped with the seed wavelength;
amplifying the first-Stokes beam with a diamond Raman amplifier (DRA), wherein the DRA comprises:
one or more pump lasers to generate pump light at the seed wavelength; and
two or more diamond Raman amplification stages, each including one or more second diamond gain media, wherein the first-Stokes beam and at least a portion of the pump light propagates colinearly through the two or more diamond Raman amplification stages; and
filtering light with a second-Stokes wavelength generated in at least one of the one or more second diamond gain media with one or more optical filters located in the DRA, the second-Stokes wavelength corresponding to second-Stokes emission in diamond when pumped with the first-Stokes wavelength.

20. The method of claim 19, further comprising:
converting at least a portion of the first-Stokes beam to a second-Stokes beam at the second-Stokes wavelength by propagating the first-Stokes beam co-linearly with light at the second-Stokes wavelength through a diamond Raman converter including one or more third diamond gain media.

* * * * *